United States Patent
Lesso (10) Patent No.: US 10,997,981 B2
(45) Date of Patent: May 4, 2021

(54) SPEAKER RECOGNITION AND SPEAKER CHANGE DETECTION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 50 days.

(21) Appl. No.: 16/122,033

(22) Filed: Sep. 5, 2018

(65) Prior Publication Data

US 2020/0075028 A1 Mar. 5, 2020

(51) Int. Cl.
G10L 17/22 (2013.01)
G10L 17/06 (2013.01)
G10L 17/02 (2013.01)
G10L 17/00 (2013.01)

(52) U.S. Cl.
CPC ............ *G10L 17/22* (2013.01); *G10L 17/00* (2013.01); *G10L 17/02* (2013.01); *G10L 17/06* (2013.01)

(58) Field of Classification Search
CPC ....... G10L 17/22; G10L 17/005; G10L 17/02; G10L 17/06
USPC ...................................................... 704/235
See application file for complete search history.

(56) References Cited

U.S. PATENT DOCUMENTS

| | | | |
|---|---|---|---|
| 5,197,113 A | 3/1993 | Mumolo | |
| 5,568,559 A | 10/1996 | Makino | |
| 5,710,866 A | 1/1998 | Alleva et al. | |
| 5,787,187 A | 7/1998 | Bouchard et al. | |
| 6,480,825 B1 | 11/2002 | Sharma et al. | |
| 7,016,833 B2 | 3/2006 | Gable et al. | |

(Continued)

FOREIGN PATENT DOCUMENTS

| | | |
|---|---|---|
| AU | 2015202397 B2 | 5/2015 |
| CN | 1937955 A | 3/2007 |

(Continued)

OTHER PUBLICATIONS

International Search Report and Written Opinion of the International Searching Authority, International Application No. PCT/GB2019/052302, dated Oct. 2, 2019.

(Continued)

*Primary Examiner* — Thierry L Pham
(74) *Attorney, Agent, or Firm* — Jackson Walker L.L.P.

(57) ABSTRACT

A method of speaker recognition comprises: receiving an audio signal comprising speech; performing a biometric process on a first part of the audio signal, wherein the first part of the audio signal extends over a first time period; obtaining a speaker recognition score from the biometric process for the first part of the audio signal; performing a biometric process on a plurality of second parts of the audio signal, wherein the second parts of the audio signal are successive sections of the first part of the audio signal, and wherein each second part of the audio signal extends over a second time period and the second time period is shorter than the first time period; obtaining a respective speaker recognition score from the biometric process for each second part of the audio signal; and determining whether there has been a speaker change based on the respective speaker recognition scores for successive second parts of the audio signal.

20 Claims, 8 Drawing Sheets

(56) References Cited

U.S. PATENT DOCUMENTS

| | | | |
|---|---|---|---|
| 7,039,951 B1* | 5/2006 | Chaudhari | G10L 17/06 |
| | | | 340/5.84 |
| 7,492,913 B2 | 2/2009 | Connor et al. | |
| 8,489,399 B2 | 7/2013 | Gross | |
| 8,856,541 B1 | 10/2014 | Chaudhury et al. | |
| 8,997,191 B1 | 3/2015 | Stark et al. | |
| 9,049,983 B1 | 6/2015 | Baldwin | |
| 9,171,548 B2 | 10/2015 | Velius et al. | |
| 9,305,155 B1 | 4/2016 | Vo et al. | |
| 9,317,736 B1 | 4/2016 | Siddiqui | |
| 9,390,726 B1 | 7/2016 | Smus et al. | |
| 9,430,629 B1 | 8/2016 | Ziraknejad et al. | |
| 9,484,036 B2 | 11/2016 | Kons et al. | |
| 9,548,979 B1 | 1/2017 | Johnson et al. | |
| 9,641,585 B2 | 5/2017 | Kvaal et al. | |
| 9,646,261 B2 | 5/2017 | Agrafioti et al. | |
| 9,659,562 B2 | 5/2017 | Lovitt | |
| 9,665,784 B2 | 5/2017 | Derakhshani et al. | |
| 9,984,314 B2 | 5/2018 | Philipose et al. | |
| 10,032,451 B1 | 7/2018 | Mamkina et al. | |
| 10,063,542 B1 | 8/2018 | Kao | |
| 10,079,024 B1 | 9/2018 | Bhimanaik et al. | |
| 10,097,914 B2 | 10/2018 | Petrank | |
| 10,192,553 B1 | 1/2019 | Chenier et al. | |
| 10,204,625 B2 | 2/2019 | Mishra et al. | |
| 10,210,685 B2 | 2/2019 | Borgmeyer | |
| 10,255,922 B1 | 4/2019 | Sharifi et al. | |
| 10,277,581 B2 | 4/2019 | Chandrasekharan et al. | |
| 10,305,895 B2 | 5/2019 | Barry et al. | |
| 10,318,580 B2 | 6/2019 | Topchy et al. | |
| 10,460,095 B2 | 10/2019 | Boesen | |
| 10,467,509 B2 | 11/2019 | Klbadawi et al. | |
| 10,733,987 B1 | 8/2020 | Govender et al. | |
| 2002/0194003 A1 | 12/2002 | Mozer | |
| 2003/0033145 A1 | 2/2003 | Petrushin | |
| 2003/0177006 A1 | 9/2003 | Ichikawa et al. | |
| 2003/0177007 A1 | 9/2003 | Kanazawa et al. | |
| 2004/0030550 A1* | 2/2004 | Liu | G10L 15/26 |
| | | | 704/231 |
| 2004/0141418 A1 | 7/2004 | Matsuo et al. | |
| 2004/0230432 A1 | 11/2004 | Liu et al. | |
| 2005/0060153 A1 | 3/2005 | Gable et al. | |
| 2005/0171774 A1 | 8/2005 | Applebaum et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0185718 A1 | 8/2007 | Di Mambro et al. | |
| 2007/0233483 A1 | 10/2007 | Kuppuswamy et al. | |
| 2007/0250920 A1 | 10/2007 | Lindsay | |
| 2008/0071532 A1 | 3/2008 | Ramakrishnan et al. | |
| 2008/0082510 A1 | 4/2008 | Wang et al. | |
| 2008/0223646 A1 | 9/2008 | White | |
| 2008/0262382 A1 | 10/2008 | Akkermans et al. | |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0167307 A1 | 7/2009 | Kopp | |
| 2009/0232361 A1 | 9/2009 | Miller | |
| 2009/0281809 A1 | 11/2009 | Reuss | |
| 2009/0319270 A1 | 12/2009 | Gross | |
| 2010/0004934 A1 | 1/2010 | Hirose et al. | |
| 2010/0076770 A1 | 3/2010 | Ramaswamy | |
| 2010/0204991 A1 | 8/2010 | Ramakrishnan et al. | |
| 2010/0328033 A1 | 12/2010 | Kamei | |
| 2011/0051907 A1 | 3/2011 | Jaiswal et al. | |
| 2011/0246198 A1 | 10/2011 | Asenjo et al. | |
| 2011/0276323 A1 | 11/2011 | Seyfetdinov | |
| 2011/0314530 A1 | 12/2011 | Donaldson | |
| 2011/0317848 A1 | 12/2011 | Ivanov et al. | |
| 2012/0110341 A1 | 5/2012 | Beigi | |
| 2012/0223130 A1 | 9/2012 | Knopp et al. | |
| 2012/0224456 A1 | 9/2012 | Visser et al. | |
| 2012/0249328 A1 | 10/2012 | Xiong | |
| 2012/0323796 A1 | 12/2012 | Udani | |
| 2013/0024191 A1 | 1/2013 | Krutsch et al. | |
| 2013/0058488 A1 | 3/2013 | Cheng et al. | |
| 2013/0080167 A1 | 3/2013 | Mozer | |
| 2013/0227678 A1 | 8/2013 | Kang | |
| 2013/0247082 A1 | 9/2013 | Wang et al. | |
| 2013/0279297 A1 | 10/2013 | Wulff et al. | |
| 2013/0279724 A1 | 10/2013 | Stafford et al. | |
| 2013/0289999 A1 | 10/2013 | Hymel | |
| 2014/0059347 A1 | 2/2014 | Dougherty et al. | |
| 2014/0149117 A1 | 5/2014 | Bakish et al. | |
| 2014/0188770 A1 | 7/2014 | Agrafioti et al. | |
| 2014/0237576 A1 | 8/2014 | Zhang et al. | |
| 2014/0241597 A1 | 8/2014 | Leite | |
| 2014/0293749 A1 | 10/2014 | Gervaise | |
| 2014/0307876 A1 | 10/2014 | Agiomyrgiannakis et al. | |
| 2014/0330568 A1 | 11/2014 | Lewis et al. | |
| 2014/0337945 A1 | 11/2014 | Jia et al. | |
| 2014/0343703 A1 | 11/2014 | Topchy et al. | |
| 2015/0006163 A1 | 1/2015 | Liu et al. | |
| 2015/0033305 A1 | 1/2015 | Shear et al. | |
| 2015/0036462 A1 | 2/2015 | Calvarese | |
| 2015/0088509 A1 | 3/2015 | Gimenez et al. | |
| 2015/0089616 A1 | 3/2015 | Brezinski et al. | |
| 2015/0112682 A1 | 4/2015 | Rodriguez et al. | |
| 2015/0134330 A1 | 5/2015 | Baldwin et al. | |
| 2015/0161370 A1 | 6/2015 | North et al. | |
| 2015/0161459 A1 | 6/2015 | Boczek | |
| 2015/0168996 A1 | 6/2015 | Sharpe et al. | |
| 2015/0245154 A1 | 8/2015 | Dadu et al. | |
| 2015/0261944 A1 | 9/2015 | Hosom et al. | |
| 2015/0276254 A1 | 10/2015 | Nemcek et al. | |
| 2015/0301796 A1 | 10/2015 | Visser et al. | |
| 2015/0332665 A1 | 11/2015 | Mishra et al. | |
| 2015/0347734 A1 | 12/2015 | Beigi | |
| 2015/0356974 A1 | 12/2015 | Tani et al. | |
| 2015/0371639 A1 | 12/2015 | Foerster et al. | |
| 2016/0026781 A1 | 1/2016 | Boczek | |
| 2016/0071516 A1 | 3/2016 | Lee et al. | |
| 2016/0086609 A1 | 3/2016 | Yue et al. | |
| 2016/0111112 A1 | 4/2016 | Hayakawa | |
| 2016/0125877 A1 | 5/2016 | Foerster et al. | |
| 2016/0125879 A1 | 5/2016 | Lovitt | |
| 2016/0147987 A1 | 5/2016 | Jang et al. | |
| 2016/0217321 A1 | 7/2016 | Gottleib | |
| 2016/0234204 A1 | 8/2016 | Rishi et al. | |
| 2016/0314790 A1 | 10/2016 | Tsujikawa et al. | |
| 2016/0330198 A1 | 11/2016 | Stern et al. | |
| 2016/0371555 A1 | 12/2016 | Derakhshani | |
| 2017/0011406 A1 | 1/2017 | Tunnell et al. | |
| 2017/0049335 A1 | 2/2017 | Duddy | |
| 2017/0068805 A1 | 3/2017 | Chandrasekharan | |
| 2017/0078780 A1 | 3/2017 | Qian et al. | |
| 2017/0110121 A1 | 4/2017 | Warford et al. | |
| 2017/0112671 A1 | 4/2017 | Goldstein | |
| 2017/0116995 A1 | 4/2017 | Ady et al. | |
| 2017/0134377 A1 | 5/2017 | Tokunaga et al. | |
| 2017/0161482 A1 | 6/2017 | Eltoft et al. | |
| 2017/0169828 A1 | 6/2017 | Sachdev | |
| 2017/0200451 A1 | 7/2017 | Booklet et al. | |
| 2017/0213268 A1 | 7/2017 | Puehse et al. | |
| 2017/0214687 A1 | 7/2017 | Klein et al. | |
| 2017/0231534 A1 | 8/2017 | Agassy et al. | |
| 2017/0256270 A1 | 9/2017 | Singaraju et al. | |
| 2017/0279815 A1 | 9/2017 | Chung et al. | |
| 2017/0287490 A1 | 10/2017 | Biswal et al. | |
| 2017/0323644 A1 | 11/2017 | Kawato | |
| 2017/0347348 A1 | 11/2017 | Masaki et al. | |
| 2017/0351487 A1 | 12/2017 | Aviles-Casco Vaquero et al. | |
| 2018/0018974 A1 | 1/2018 | Zass | |
| 2018/0032712 A1 | 2/2018 | Oh et al. | |
| 2018/0039769 A1 | 2/2018 | Saunders et al. | |
| 2018/0047393 A1 | 2/2018 | Tian et al. | |
| 2018/0060557 A1 | 3/2018 | Valenti et al. | |
| 2018/0096120 A1 | 4/2018 | Boesen | |
| 2018/0107866 A1 | 4/2018 | Li et al. | |
| 2018/0108225 A1 | 4/2018 | Mappus et al. | |
| 2018/0113673 A1 | 4/2018 | Sheynblat | |
| 2018/0121161 A1 | 5/2018 | Ueno et al. | |
| 2018/0146370 A1 | 5/2018 | Krishnaswamy et al. | |
| 2018/0166071 A1 | 6/2018 | Lee et al. | |

(56) References Cited

U.S. PATENT DOCUMENTS

| | | |
|---|---|---|
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0336716 A1 | 11/2018 | Ramprashad et al. |
| 2018/0336901 A1 | 11/2018 | Masaki et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0065478 A1 | 2/2019 | Tsujikawa et al. |
| 2019/0098003 A1 | 3/2019 | Ota |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0147888 A1 | 5/2019 | Lesso |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |

FOREIGN PATENT DOCUMENTS

| | | |
|---|---|---|
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| EP | 1205884 A2 | 5/2002 |
| EP | 1600791 A1 | 11/2005 |
| EP | 1701587 A2 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | M07034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A1 | 4/2017 |
| WO | 2017203484 A1 | 11/2017 |

OTHER PUBLICATIONS

Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.

(56) References Cited

OTHER PUBLICATIONS

Partial International Search Report of the International Searching Authority, International Application No. PCT/GB2018/052905, dated Jan. 25, 2019.
Combined Search and Examination Report, UKIPO, Application No. GB1713699.5, dated Feb. 21, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
Further Search Report under Sections 17 (6), UKIPO, Application No. GB1719731.0, dated Nov. 26, 2018.
Combined Search and Examination Report, UKIPO, Application No. GB1713697.9, dated Feb. 20, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
Chen et al., "You Can Hear But You Cannot Steal: Defending Against Voice Impersonation Attacks on Smartphones", Proceedings of the International Conference on Distributed Computing Systems, PD: 20170605.
Combined Search and Examination Report under Sections 17 and 18(3), UKIPO, Application No. GB1809474.8, dated Jul. 23, 2018.
International Search Report and Written Opinion of the International Searching Authority, International Application No. PCT/GB2019/050185, dated Apr. 2, 2019.
Lucas, Jim, What is Electromagnetic Radiation?, Mar. 13, 2015, Live Science, https://www.livescience.com/38169-electromagnetism.html, pp. 1-11 (Year: 2015).
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inauadible voice commands allow attackers to control Siri, Alexa and other digital assistants, Sep. 2017.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al, "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
First Office Action, China National Intellectual Property Administration, Application No. 2018800720846, dated Mar. 1, 2021.

\* cited by examiner

| Speaker 1 | Wake up phone |
|---|---|
| Speaker 2 | Order me a beer |

Fig. 3

| Speaker 1 | Wake up phone.  Order me a pizza |
|---|---|
| Speaker 2 | And a beer |

SPEAKER RECOGNITION AND SPEAKER CHANGE DETECTION

TECHNICAL FIELD

This invention relates to speaker recognition.

In this document, the term speaker recognition is used to refer to a process in which information is obtained about the identity of a speaker. For example, this process may involve determining whether or not the speaker is a specific individual (speaker verification), or may involve identifying the speaker, for example from a group of enrolled speakers (speaker identification).

The term speech recognition is used to refer to a process in which information is obtained about the content of speech, for example in order to be able to determine what the speaker is saying.

BACKGROUND

Systems are known in which a verbal command from a speaker is recognised and processed, subject to the speaker's identity being verified. One such system is disclosed in GB-2515527A, for example, in which, if it is determined that a predetermined trigger phrase has been spoken, a speaker recognition process is performed in a first device. If the speaker recognition process determines that the predetermined trigger phrase was spoken by a specific enrolled user, the signal representing the speech is passed to a speech recognition engine, which may be provided in a separate second device. Typically, such a system may be used to allow the user to issue voice commands, causing the system to perform some action, or retrieve some requested information, for example.

One problem that could in theory arise in such a system is an attack, in which a third party attempts to gain unauthorised access to the system, by speaking after the enrolled user has spoken the predetermined trigger phrase. The speaker recognition process would recognise that the enrolled user was speaking initially, and the third party's speech may be of a sufficiently short duration that the speaker recognition process is unable to determine that the entirety of the speech was not spoken by the enrolled user.

SUMMARY

According to an aspect of the present invention, there is provided a method of speaker recognition, comprising:
 receiving an audio signal comprising speech;
 performing a biometric process on a first part of the audio signal, wherein the first part of the audio signal extends over a first time period;
 obtaining a speaker recognition score from the biometric process for the first part of the audio signal;
 performing a biometric process on a plurality of second parts of the audio signal, wherein the second parts of the audio signal are successive sections of the first part of the audio signal, and wherein each second part of the audio signal extends over a second time period and the second time period is shorter than the first time period;
 obtaining a respective speaker recognition score from the biometric process for each second part of the audio signal; and
 determining whether there has been a speaker change based on the respective speaker recognition scores for successive second parts of the audio signal.

In some embodiments, determining whether there has been a speaker change based on speaker recognition scores for successive second parts of the audio signal comprises determining that there has been a speaker change if speaker recognition scores for successive second parts of the audio signal show a variation that exceeds a threshold.

The method may comprise:
 storing the received audio signal;
 performing a keyword detection process on the received audio signal; and
 when a predetermined keyword is detected, identifying a start of the first time period at a start of the predetermined keyword.

In that case, the method may comprise:
 performing automatic speech recognition on the received audio signal from an end of the predetermined keyword.

In that case, the method may comprise:
 performing automatic speech recognition on the received audio signal from an end of the predetermined keyword only if the speaker recognition score obtained for the first part of the audio signal indicates that the speech is the speech of a predetermined speaker.

In some embodiments, the method comprises:
 performing a text-dependent biometric process on the received audio signal representing the predetermined keyword; and
 performing a text-independent biometric process on the received audio signal following the predetermined keyword.

The second time period may be in the range 0.5 s-1.5 s.

The method may comprise performing the biometric process on the first part of the audio signal at a plurality of times during the first time period, and obtaining a respective speaker recognition score at each of the plurality of times, wherein the speaker recognition score obtained at each of the plurality of times is a cumulative score relating to the first part of the audio signal up until that time.

The method may comprise defining an end point of the first part of the audio signal in response to determining that there has been a speaker change, and then performing said biometric process on the first part of the audio signal.

The method may comprise using said speaker recognition score obtained for the first part of the audio signal, only in response to determining that there has not been a speaker change during the first part of the audio signal.

The step of obtaining the speaker recognition score from the biometric process for the first part of the audio signal may comprise combining the respective speaker recognition scores obtained from the biometric process for each second part of the audio signal.

This has the advantage that the speech that a speaker change detection process is able to determine when some of the detected speech was not spoken by the enrolled user, helping to ensure that the attack described above cannot be successful.

According to a second aspect of the present invention, there is provided a method of speaker change detection, comprising:
 receiving an audio signal representing speech;
 performing at least one first speaker change detection process on the received audio signal to obtain information about times at which there may have been a speaker change;
 performing a biometric process on a plurality of successive sections of the audio signal;

obtaining a speaker recognition score from the biometric process for each section of the audio signal;

obtaining information about times at which there may have been a speaker change, based on the speaker recognition scores obtained from the biometric process; and determining whether there has been a speaker change based on information obtained from the first speaker change detection process and based on information obtained from the speaker recognition scores.

Obtaining information about times at which there may have been a speaker change, based on the speaker recognition scores obtained from the biometric process, may comprise:

examining successive speaker recognition scores for the sections of the audio signal in order to determine a series of difference values between pairs of consecutive speaker recognition scores for the successive sections of the audio signal; and determining that there may have been a speaker change when one of said difference values exceeds a threshold value.

The first speaker change detection process may comprise one or more of:

tracking a fundamental frequency of the speech;

tracking an angle of arrival of the speech at a device; and comparing feature vectors extracted from the audio signal in successive time windows of the audio signal.

The method may comprise obtaining a respective metric from the or each first speaker change detection process and from the speaker recognition scores obtained from the biometric process, wherein each respective metric indicates a likelihood that there has been a speaker change, and determining whether there has been a speaker change based on said metrics.

When the method comprises obtaining a respective metric from the or each first speaker change detection process and from the speaker recognition scores obtained from the biometric process, the method may comprise:

combining the respective metrics to form a combined metric;

comparing the combined metric with a threshold value; and determining whether there has been a speaker change based on a result of the comparison.

When the method comprises obtaining a respective metric from the or each first speaker change detection process and from the speaker recognition scores obtained from the biometric process, the method may comprise:

comparing each metric with a respective threshold value; and determining whether there has been a speaker change based on a result of the respective comparisons.

In that case, the method may comprise: determining that there has been a speaker change if any one of the metrics exceeds its respective threshold value.

Alternatively, the method may comprise:

determining that there has been a speaker change if a majority of the metrics exceed their respective threshold values.

As a further alternative, the method may comprise:

determining that there has been a speaker change if all of the metrics exceed their respective threshold values.

This has the advantage that a simple and reliable speaker change detection process is provided.

According to a further aspect, there is provided a system configured to perform any of the methods defined above. For example, the system may comprise: an input for receiving an audio signal representing speech; and a processor configured to perform a method in accordance with any of the methods defined above.

The system may be implemented in electronic device, for example a smartphone or other communications device, a smart speaker, a tablet or laptop computer, a games console, a home control system, a home entertainment system, an in-vehicle entertainment system, or a domestic appliance.

According to a further aspect, there is provided a non-transitory storage medium having stored thereon software code which, when run on a suitable processor, performs any of the methods defined above.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
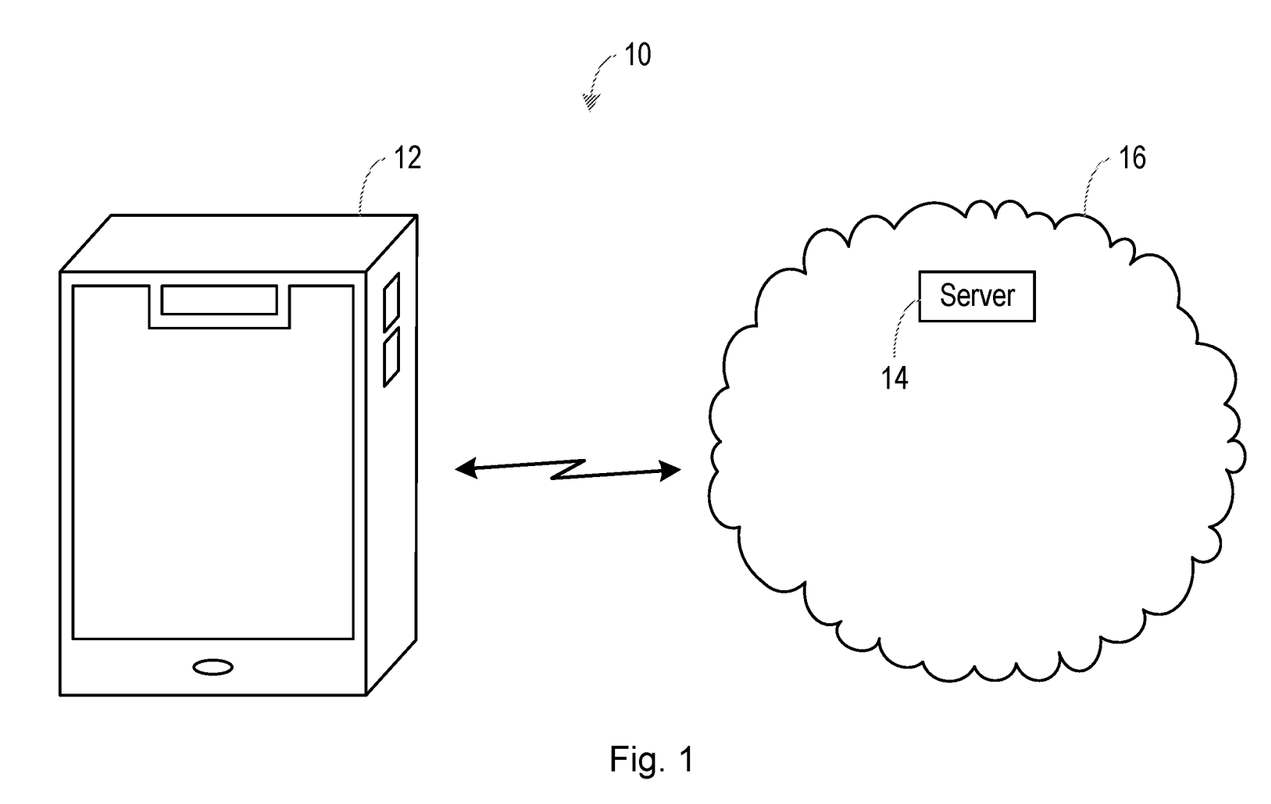
FIG. 1 illustrates a system in accordance with an aspect of the invention.

FIG. 1 shows an example of a system 10 in which the invention may be implemented. In this example, a speaker recognition process takes place in a first device 12. As illustrated here, the first device 12 takes the form of a smartphone, but it may be any (portable) electronic device with some sort of voice operability, for example a smart speaker, a tablet or laptop computer, a games console, a home control system, a home entertainment system, an in-vehicle entertainment system, a domestic appliance, or the like.

The device 12 includes a speaker recognition block. Thus, the device 12 also includes at least one microphone and, when it is determined that a sound detected by the microphone(s) contains speech, the speaker recognition block may for example determine whether or not the speaker is a specific individual, or may identify the speaker from a group of enrolled speakers.

In this embodiment, if it is determined that the speaker is an enrolled speaker, the signal representing the speech may be passed to a separate second device 14 located remotely from the first device 12. For example, the second device 14 may take the form of a server located in the cloud 16, accessible by the first device over a wireless communications network. The second device 14 includes a speech recognition block. When a signal representing speech is supplied to the second device 14, the speech recognition block may obtain information about the content of the speech, for example in order to be able to determine the content of a command.

Although an embodiment is shown here, in which the speaker recognition and the speech recognition take place in separate devices, in other examples, the speaker recognition and the speech recognition take place in the same device, for example a smartphone, a smart speaker, a tablet or laptop computer, a games console, a home control system, a home entertainment system, an in-vehicle entertainment system, a domestic appliance, or the like.

Figure 2:
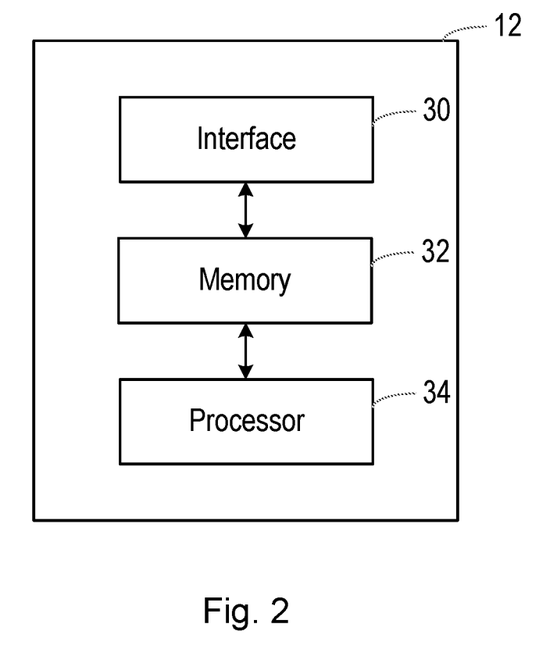
FIG. 2 illustrates an example of a first device in the system of FIG. 1.

FIG. 2 shows one possible form of the first device 12. In this example, the first device 12 includes an interface 30, for connecting to other devices; a memory 32, for storing data and program instructions; and a processor 34, for performing operations in accordance with program instructions stored in the memory 32. Thus, with reference to FIG. 1 and the description thereof above, a speaker recognition block may be implemented by suitable program instructions stored in the memory 32, causing the processor 34 to perform the speaker recognition functionality.

Figure 3:
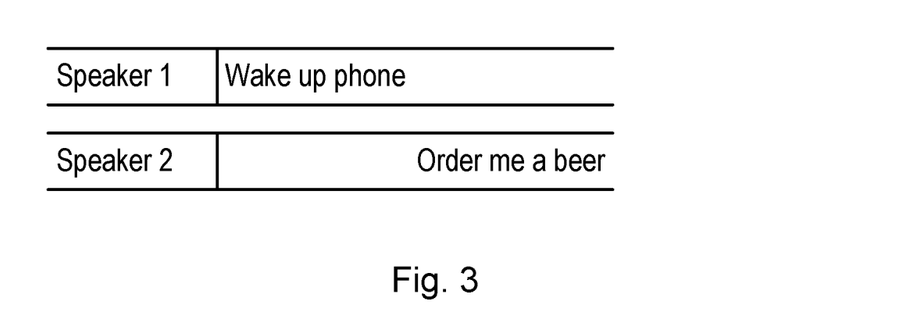
FIG. 3 illustrates a first attack on a system using speaker recognition.

FIG. 3 illustrates a possible attack on a system using speech recognition, and specifically a voice assistant system that allows an enrolled user to speak commands that the system will act upon. The voice assistant system uses speaker recognition to ensure that a command was spoken by the enrolled user, before it acts upon the command.

The voice assistant system is woken from a low-power operating mode by a trigger phrase, in this case "Wake up phone". Speech that follows the trigger phrase is sent to a speech recognition system, in order to identify the meaning of the speech. In addition, the signal representing the trigger phrase and the following speech is sent to a speaker recognition system, in order to determine whether the speaker is an enrolled user, for example the owner of the device or a person authorised by the owner.

One problem with such systems is that the reliability of the speaker recognition process depends on the duration of the speech that is considered. Longer utterances allow the speaker recognition system to operate with greater certainty. In addition, in a system that is woken using a predetermined trigger phrase, the speaker recognition system can use a text-dependent system to analyse the trigger phrase, but must use a text-independent system to analyse the speech following the trigger phrase. Since text-dependent speaker recognition is generally more reliable than text-independent speaker recognition, more weight might be given to the results of the text-dependent speaker recognition than to the results of the text-independent speaker recognition. This means that, provided that the trigger phrase is spoken by the enrolled user, then even if the speech following the trigger phrase is spoken by a different person, it might take some significant time before the overall result of the speaker recognition system recognises that there has been a change of speaker, and that it is no longer accurate to say that the speech was uttered by the enrolled user.

Thus, FIG. 3 shows a situation where an enrolled user, Speaker 1, utters the predetermined trigger phrase "Wake up phone". Immediately thereafter, another person, Speaker 2, utters a command "Order me a beer". This is referred to as a competitive command.

Figure 4:
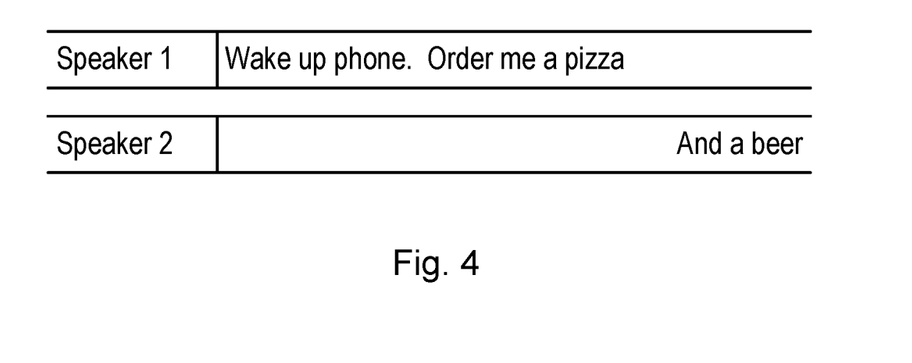
FIG. 4 illustrates a second attack on a system using speaker recognition.

FIG. 4 shows a situation where an enrolled user, Speaker 1, utters the predetermined trigger phrase "Wake up phone", and then also utters a command "Order me a pizza". Immediately thereafter, another person, Speaker 2, utters an additional command "And a beer". This is referred to as a tailgating attack.

Methods and systems described herein involve speaker change detection, so that attacks such as those illustrated in FIGS. 3 and 4 can be overcome.

Figure 5:
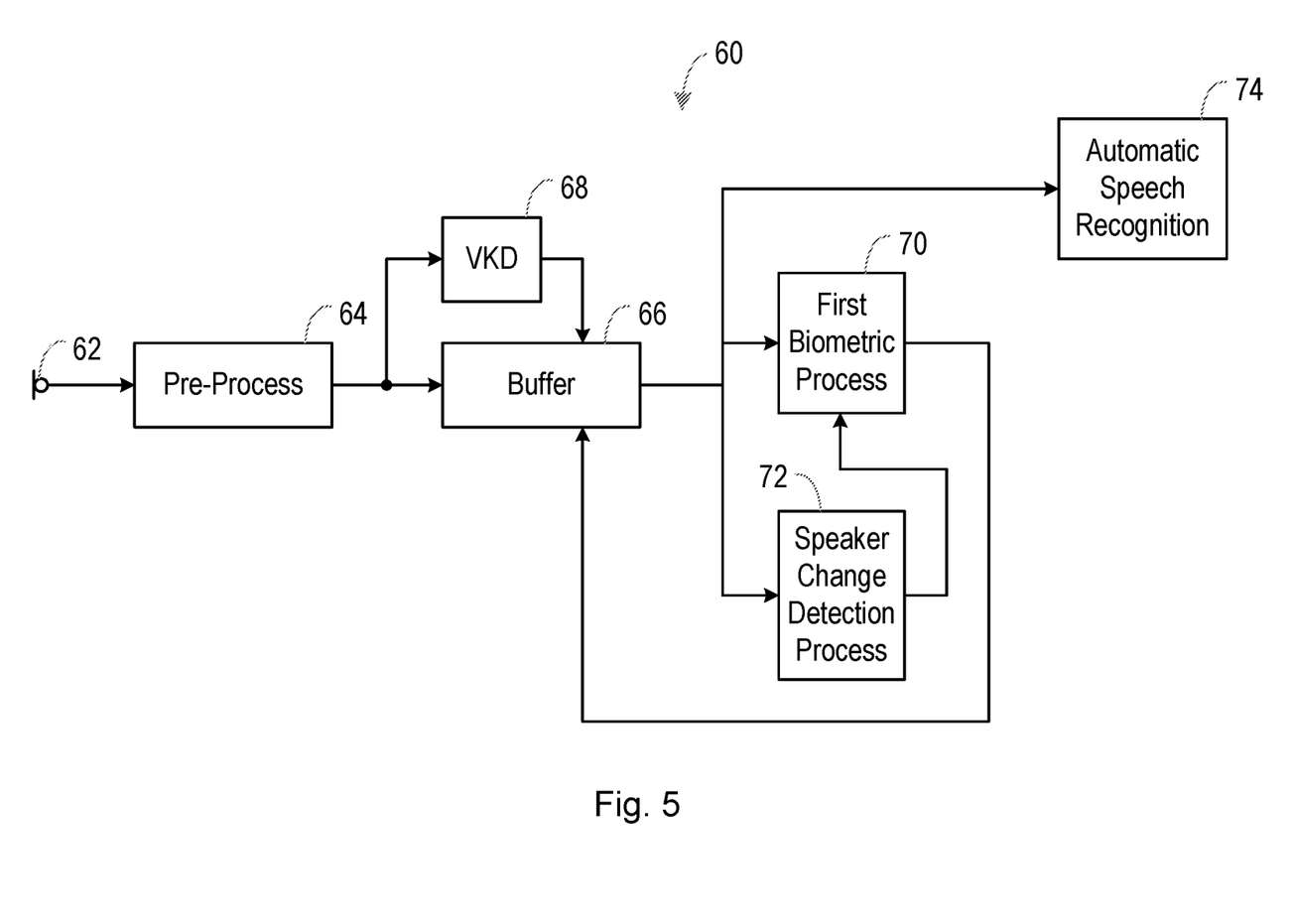
FIG. 5 is a block diagram, illustrating a system in accordance with an aspect of the invention.
Figure 6:
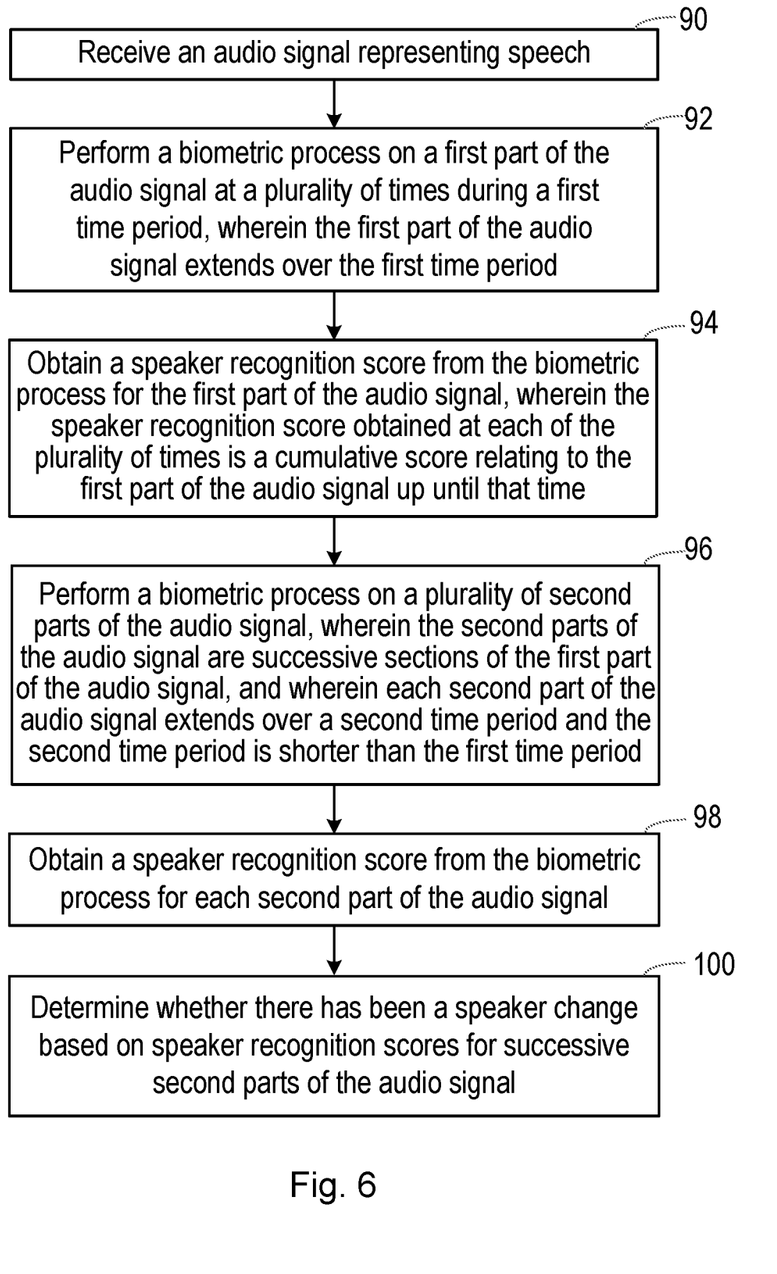
FIG. 6 is a flow chart, illustrating a method in accordance with an aspect of the invention.

FIG. 5 is a block schematic diagram, illustrating a system configured for including speaker change detection as part of the speaker recognition system, and FIG. 6 is a flow chart, illustrating an example of a method of performing speech recognition, in a system as illustrated in FIG. 5, for example. It should be noted that, although FIG. 6 is presented as a flow chart, in which steps are performed successively, this represents just one embodiment. In other embodiments, the order of the steps may be different from that shown in FIG. 6, and/or steps may be performed in parallel, and/or one or more steps may be performed only when another step has been completed (and, in some cases, when the other step has produced one specific result).

FIG. 5 shows a system 60, which includes a microphone 62 for detecting sounds in the vicinity. In embodiments in which the system is implemented in a smartphone or other device, the microphone 62 may be the microphone of that device.

The system 60 also includes a pre-processing block 64, which performs initial processing on the audio signal generated by the microphone 62, and stores the result in a buffer 66. For example, speaker recognition and speech recognition processes typically operate on signals that have been divided into frames having a duration of 10-30 ms, and so the pre-processing block 64 may perform this division. Specifically, the pre-processing block 64 may divide the signal into frames, and may include a voice activity detection block, configured to determine which frames contain speech.

In the system illustrated in FIG. 5, the system also includes an optional voice keyword detection (VKD) block 68. This may be configured to detect whether the audio signal represents a predetermined keyword, or trigger phrase. The VKD block 68 may act only on frames that are determined as containing speech.

Thus, the received audio signal is stored, a keyword detection process is performed on the received audio signal, and, when a predetermined keyword is detected, a start of the predetermined keyword is identified as a start of a first time period.

Thus, in some embodiments, the audio signal is only passed for subsequent processing if it is determined that the signal contains speech. In some embodiments, the audio signal is only passed for subsequent processing if it is determined that the signal contains the predetermined keyword.

Thus, provided that any condition as described above is met, the audio signal, or at least part of the audio signal, is passed to a first biometric process block 70, which performs speaker recognition. For example, if the voice keyword detection block 68 determines that the signal contains the predetermined trigger phrase, the part of the signal beginning at the start of the predetermined trigger phrase (i.e. at the start of the first time period identified above) is sent from the buffer 66 to the first biometric process block 70.

Therefore, referring to FIG. 6, at step 90, an audio signal comprising speech is received.

At step 92, a biometric process is performed on the received first part of the audio signal. The first part of the audio signal is considered to extend over the first time period mentioned above. The biometric process may be performed at a plurality of times during the first time period.

In one embodiment, the biometric process performed at step 92 includes both a text-dependent process and a text-independent process. In this case, the text-dependent process may be used to analyse the segment of the received signal that represents the trigger phrase, while the text-independent process is used to analyse the segment of the received signal that follows the trigger phrase.

As shown at step 94 of FIG. 6, the step of performing the biometric process at step 92 may therefore comprise obtaining a speaker recognition score from the biometric process for the first part of the audio signal. When the biometric process is performed at a plurality of times, the speaker recognition score obtained at each of the plurality of times may be a cumulative score relating to the entire first part of the audio signal up until that time.

The score that is obtained in step 94 may be an output that indicates whether or not the speaker is a specific individual (in the case of speaker verification), or identifies the speaker from a group of enrolled speakers (in the case of speaker identification). Alternatively, the score that is obtained in step 94 may be a numerical value that can for example be compared with an appropriate threshold in a subsequent process in order to allow a determination as to whether or not the speech should be considered to be that of the specific individual (in the case of speaker verification), or which of a group of enrolled speakers should be considered to be speaking (in the case of speaker identification).

In some embodiments, the biometric process is performed on the complete utterance that includes the trigger phrase. For example, the entire signal from the start of the trigger phrase until it is determined that the speech has stopped or the speaker has changed can be analysed. Calculating the cumulative score at the plurality of times means that, in this case, as soon as it is determined that the speech has stopped or the speaker has changed, there is an up-to-date score that has recently been calculated. In other embodiments, only a part of the signal is analysed.

As shown in FIG. 5, the first part of the audio signal, i.e. the part of the audio signal starting at the start of the predetermined trigger phrase, is also passed to a speaker change detection process 72. In the illustrated embodiment, the speaker change detection process is a biometric speaker change detection process.

Thus, as shown in FIG. 6, at step 96, a biometric process is performed on a plurality of second parts of the audio signal, wherein the second parts of the audio signal are successive sections of the first part of the audio signal, and wherein each second part of the audio signal extends over a second time period and the second time period is shorter than the first time period. For example, the second time period may be in the range 0.1 s-5 s. More specifically, the second time period may be in the range 0.5 s-1.5 s. Choosing a longer value for the second time period means that the scores obtained from the biometric process during the respective second time periods will likely be more consistent. However, choosing a shorter value means that there will be more such scores in a given utterance, making it easier to identify a speaker change from the series of scores, and so it is necessary to choose a suitable value based on these two factors.

Even in embodiments in which the biometric process performed at step 92 includes both a text-dependent process and a text-independent process, the biometric process performed at step 96 may include only a text-independent process. This provides a way to obtain consistent scores across the whole audio signal.

The biometric process performed at step 96 may be a scheme that allows scoring per frame, such as a scheme using a Gaussian Mixture Model (GMM). The biometric process performed at step 92 may be a scheme that allows scoring per frame, such as a scheme using a Gaussian Mixture Model (GMM), in embodiments in which a cumulative score is continually updated during the speech. In embodiments in which the biometric process performed at step 92 is performed only on a complete utterance, a system that supports scoring per utterance, such as a scheme using Joint Factor Analysis (JFA) may be used. In such embodiments, the complete utterance may be the entire signal from the start of the trigger phrase until it is determined that the speech has stopped or the speaker has changed. Alternatively, the complete utterance may be the signal that follows the end of the trigger phrase until it is determined that the speech has stopped or the speaker has changed.

At step 98, a speaker recognition score is obtained from the biometric process for each second part of the audio signal. For example, the biometric process may involve extracting features from the relevant part of the audio signal, and comparing these features with a corresponding set of features (also referred to as a model, or a voice print) from the speech of a speaker. For these purposes, the model that is used as the basis of the comparison may be a Universal background Model, or may be a speaker-specific model, for example for the expected speaker (such as the enrolled user of the device).

The speaker recognition score that is obtained may then be a measure of the distance of the extracted features from the model that is used as the basis for the comparison. The speaker recognition score may for example be expressed as a likelihood that the speech is from a specific previously-enrolled speaker.

At step 100, it is determined whether there has been a speaker change based on speaker recognition scores for successive second parts of the audio signal. For example, when the speaker recognition score that is obtained is a measure of the distance of the extracted features from a speaker model, it would be expected that the score would be relatively consistent for each second part of the audio signal for the voice of a single speaker. Thus, if a speaker recognition score that is obtained for one second part of the audio signal is significantly different from the scores obtained for preceding second parts, this may be taken as an indication that the speaker has changed.

Thus, determining whether there has been a speaker change based on speaker recognition scores for successive second parts of the audio signal may comprise determining that there has been a speaker change if speaker recognition scores for successive second parts of the audio signal detection show a variation that exceeds a threshold.

For example, this determination may simply involve comparing each score to the immediately preceding score, and determining that there has been a speaker change if the difference between the two speaker recognition scores exceeds a threshold value.

Alternatively, a statistical analysis may be performed, comparing each score with a metric derived from some or all previously calculated scores, and determining that there has been a speaker change if the most recent score falls outside an expected distribution. In one scheme, a running mean of all previously calculated scores is formed, and any newly calculated score that is sufficiently far from that mean is considered as a possible indicator of a speaker change. More generally, the Kolmogorov-Smirnov test can be used to compare a newly calculated score with a cumulative distribution function (for example an empirical cumulative distribution function) calculated from previously calculated scores, in order to determine whether the newly calculated score is likely to indicate a speaker change.

In this example, the speaker change detection is based entirely on the biometric speaker change detection. However, an alternative method of speaker change detection combines the biometric method with at least one other method.

Figure 7:
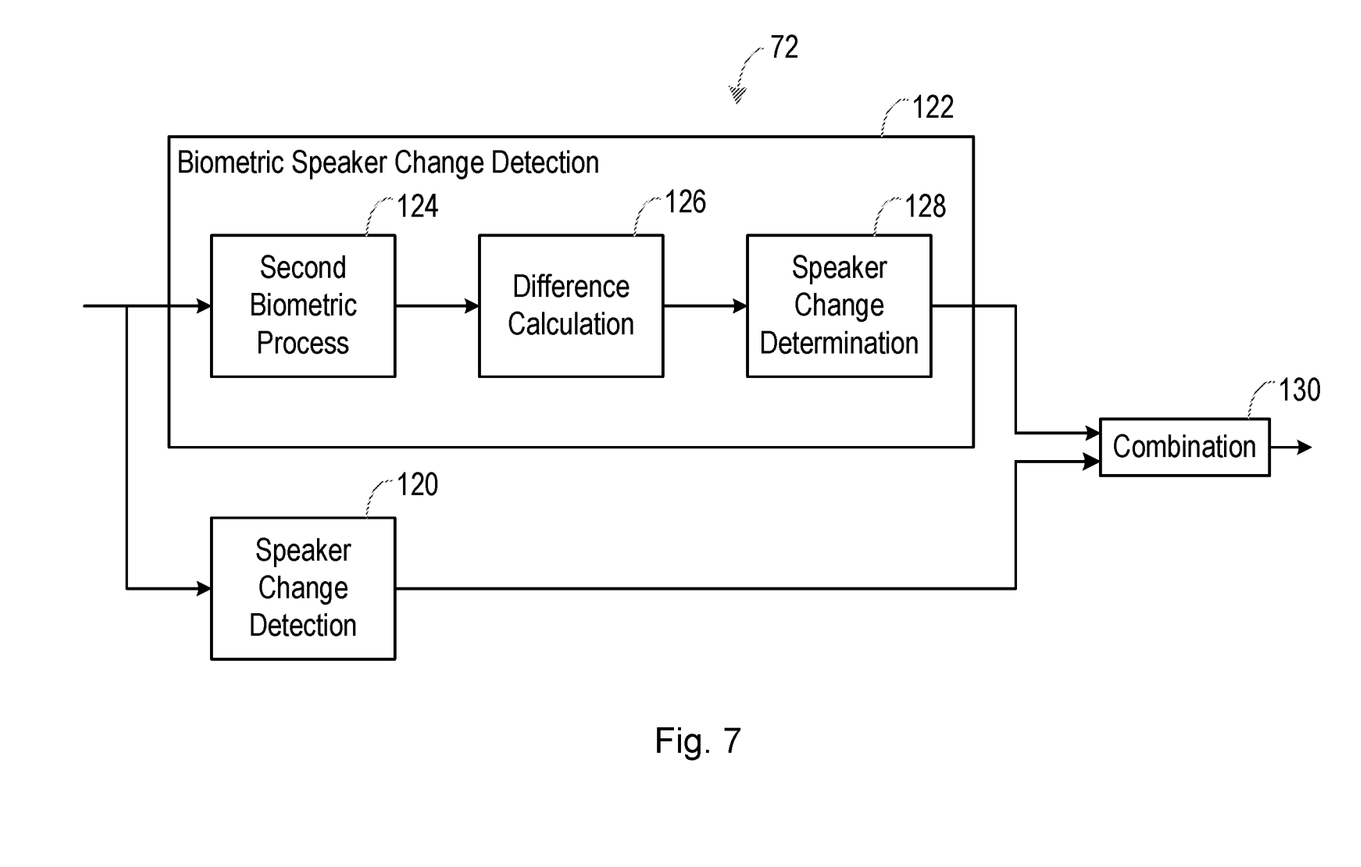
FIG. 7 is a block diagram, illustrating a part of the system of FIG. 5.
Figure 8:
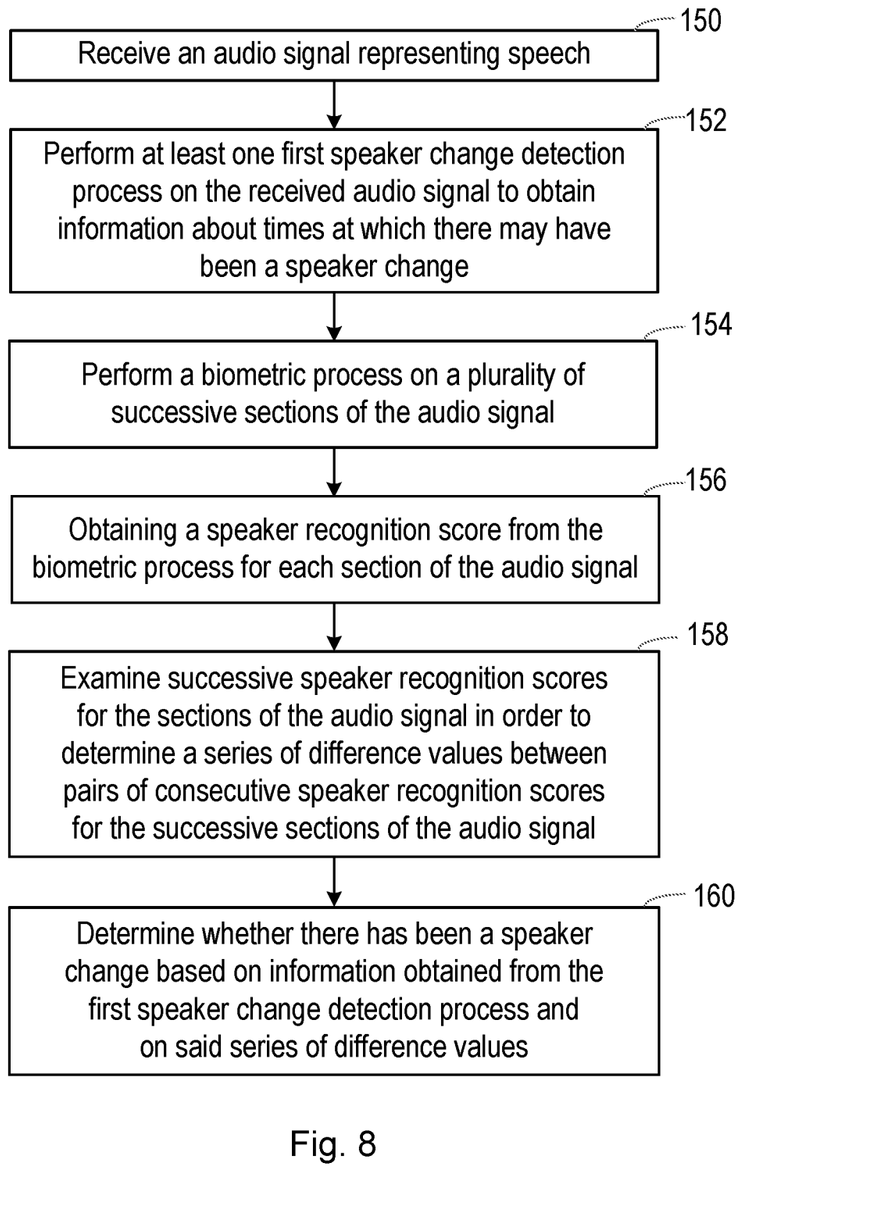
FIG. 8 is a flow chart, illustrating a method in accordance with an aspect of the invention.

FIG. 7 is a block schematic diagram, illustrating a system for speaker change detection, and FIG. 8 is a flow chart, illustrating an example of a method of performing speaker change detection, in a system as illustrated in FIG. 7, for example.

FIG. 7 shows a system 72, for example for use in the system of FIG. 5, although there are other situations in which speaker change detection is useful, and the system and method of FIGS. 7 and 8 can be used in any such situation.

The audio signal representing speech, for example retrieved from a buffer as shown in FIG. 5, is passed to a speaker change detection block 120. Thus, in step 150 of the process shown in FIG. 8, the signal is received and, in step 152, at least one first speaker change detection process is performed on the received audio signal to obtain information about times at which there may have been a speaker change.

For example, the at least one first speaker change detection process may be one or more process selected from the group consisting of:
tracking a fundamental frequency of the speech;
tracking an angle of arrival of the speech at a device; and
comparing feature vectors extracted from the audio signal in successive time windows of the audio signal, for example as described in J. Ajmera, I. McCowan, and H. Bourlard, "Robust speaker change detection", 2004 IEEE Signal Processing Letters, vol. 11, no. 8, pp. 649-651, August 2004.

In addition, the audio signal representing speech is passed to a biometric speaker change detection block 122. This operates in a similar manner to that described above. Thus, the audio signal representing speech is passed to a second biometric process block 124 and, in step 154 of FIG. 8, a biometric process is performed on a plurality of successive sections of the audio signal. In step 156, a speaker recognition score is obtained from the biometric process for each section of the audio signal. As described above, the speaker recognition score that is obtained for each section may be a measure of the distance of the extracted features of that section of the audio signal from the model that is used as the basis for the comparison.

The speaker recognition scores are passed to a difference calculation block 126. Thus, in step 158, successive speaker recognition scores for the sections of the audio signal are examined in order to determine a series of difference values between pairs of consecutive speaker recognition scores for the successive sections of the audio signal. These difference values are then passed to a speaker change determination block 128, which uses the difference values for providing an indication of whether there has been a speaker change.

Output signals from the speaker change determination block 128 and the speaker change detection block 120 are passed to a combination block 130 and, in step 160, it is determined whether there has been a speaker change based on information obtained from the first speaker change detection process and on said series of difference values.

Thus, multiple metrics may be combined to form a single output score. Each metric may for example be a measure of the likelihood that there has been a speaker change during a particular time period, which may be as long as the entire utterance. If there are n metrics, and each of the metrics (i.e. the metric obtained from the speaker change determination block 128 and the one or more metric obtained from the speaker change detection block 120) has a value $\alpha_i$, these values can be given respective weightings $\omega_i$, and a combined output score S can be calculated as:

$$S = \sum_{i=1}^{n} \alpha_i \omega_i$$

The weighting given to each metric may be arranged to give increased weight to more accurate metrics. There are multiple ways to calculate the weighting. For example, one way uses the Equal Error Rate calculated for the different metrics. Thus, if a group of metrics have respective Equal Error Rates $EER_i$, the weighting given to each metric value can be calculated as:

$$\omega_i = \frac{1}{EER_i} \bigg/ \sum_{i=1}^{n} \frac{1}{EER_i}$$

Similarly, the weighting may accordingly be calculated using the False Acceptance Rate, FAR, or False Rejection Rate, FRR, for each metric.

Thus, in step 160, it may be determined whether there has been a speaker change based on a determination as to whether the single combined output score exceeds a threshold value.

Alternatively, each metric may be compared with its own respective threshold value, and the determination as to whether there has been a speaker change may be based on the set of comparison results. For example, it may be determined that there has been a speaker change if any one of the metrics exceeds its respective threshold value. Alternatively, it may be determined that there has been a speaker change if a majority of the metrics exceed their respective threshold values. Alternatively, it may be determined that there has been a speaker change if all of the metrics exceed their respective threshold values.

There are therefore various ways in which it might be determined if there has been a speaker change.

In addition, there are various steps that might be taken in response to determining that there has been a speaker change. Returning to FIG. 5, the signal stored in the buffer 66 may be passed to an automatic speech recognition block 74. In a system having a voice keyword detection block 68, automatic speech recognition may be performed only on the received audio signal starting from the end of the predetermined keyword.

The speech recognition block 74 is able to determine the meaning of the spoken words contained in the signal that it receives, and, for example, interpret these as a command, and take suitable action in response to the command. In order to prevent the attacks described with reference to FIGS. 3 and 4, for example, the action taken in response to a speaker change detection might for example be to send to the automatic speech recognition block 74 only the speech that occurs before a speaker change. Then, if there is a speaker change, for example in a competitive command or a tailgating attack, the speech of the second speaker will not be send to the automatic speech recognition block 74 for processing and interpretation.

In other examples, the detection of a speaker change might be used as a signal to the first biometric process 70 to stop performing the speaker recognition.

In other examples, the stored speech signal is retrieved first by the speaker change detection process 72, and steps 96 and 98 of FIG. 6 are performed. When it is determined in step 100 that there has been a speaker change, the stored speech signal is retrieved by the first biometric process 70, and step 92 is performed. In this case, it is only necessary for the first biometric process 70 to retrieve the stored speech signal up until the time at which the speaker change was detected. Thus, the time at which the speaker change is detected defines an end point of the first part of the audio signal. If it is determined in step 100 that there has been no speaker change, the stored speech signal is retrieved by the first biometric process 70 only at the end of the whole utterance, and step 92 is performed on the whole utterance. In these examples, the first biometric process 70 may determine whether the speaker was the expected enrolled speaker and, if so, a signal may be sent to the buffer 66, so that the audio signal stored in the buffer 66 is passed to an automatic speech recognition block 74 for interpretation of the enrolled speaker's utterance.

In other examples, the stored speech signal is retrieved by the first biometric process 70, for example at the end of a whole utterance, and step 92 is performed on the whole utterance or other retrieved signal. As usual, the first biometric process 70 may determine whether the speaker was the expected enrolled speaker. Either in parallel with this, or only after determining that the speaker was the expected enrolled speaker, the stored speech signal is retrieved first by the speaker change detection process 72, and steps 96 and 98 of FIG. 6 are performed. In this case, when it is determined in step 100 that there has been a speaker change, the stored speech signal may be considered to have been tampered with, and may be discarded. Only in response to determining that there has not been a speaker change during the first part of the audio signal, the speaker recognition score obtained for the first part of the audio may be used. Thus, if the score indicates that the speaker was the expected enrolled speaker, a signal may be sent to the buffer 66, so that the audio signal stored in the buffer 66 is passed to an automatic speech recognition block 74 for interpretation of the enrolled speaker's utterance.

In other examples, the stored speech signal is retrieved first by the speaker change detection process 72, and steps 96 and 98 of FIG. 6 are performed. When it is determined in step 100 that there has been a speaker change, the stored speech signal is retrieved by the first biometric process 70, and step 92 is performed. In this case, it is only necessary for the first biometric process 70 to retrieve the stored speech signal up until the time at which the speaker change was detected. Thus, the time at which the speaker change is detected defines an end point of the first part of the audio signal. If it is determined in step 100 that there has been no speaker change, step 92 is performed on the whole utterance. In this case, the step of obtaining the speaker recognition score from the biometric process for the first part of the audio signal may comprise combining the respective speaker recognition scores obtained from the biometric process for each second part of the audio signal. Thus, as part of the speaker detection process, a separate speaker recognition score is obtained for each second part of the audio signal. When it has been determined that there is no speaker change during the whole utterance, a speaker recognition score for the whole utterance may be obtained by combining (for example averaging) these separate speaker recognition scores. Similarly, when it is determined that there has been a speaker change, a speaker recognition score for the first part of the signal up until the speaker change may be obtained by combining (for example averaging) the separate speaker recognition scores for the same part of the signal. Again, the first biometric process 70 may determine from this speaker recognition score for the first part of the signal whether the speaker was the expected enrolled speaker and, if so, a signal may be sent to the buffer 66, so that the audio signal stored in the buffer 66 is passed to an automatic speech recognition block 74 for interpretation of the enrolled speaker's utterance.

Figure 9:
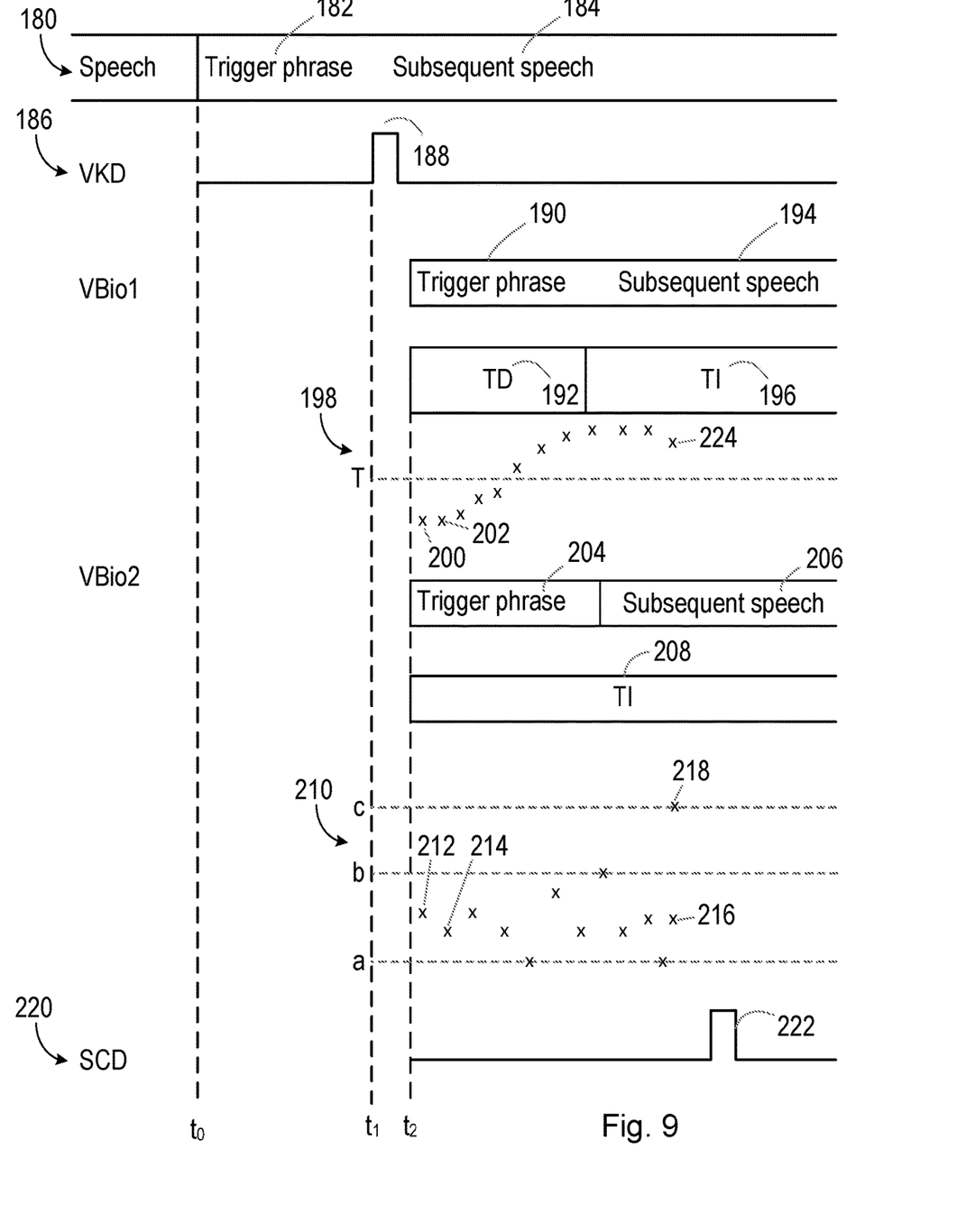
FIG. 9 is a timing diagram, illustrating the operation of the system and method.

FIG. 9 is a timing diagram, illustrating operation of the system and method described herein, in one example situation.

30

Line 180 shows the speech that is detected by the pre-processing block 64 in FIG. 5. In this example, this speech begins at time $t_0$ with a trigger phrase 182, and continues thereafter with subsequent speech 184.

Line 186 shows the operation of the voice keyword detection (VKD) block 68 in FIG. 5. In this example, at time ti, the VKD block identifies that the trigger phrase has been spoken, and generates a signal 188.

In response, the signal from the start of the trigger phrase is retrieved from the buffer 66 and passed to the first biometric process 70 and the speaker change detection process 72.

The first biometric process Vbio1 therefore starts operating at time t2, after the shortest possible delay from the time when the VKD block identifies that the trigger phrase has been spoken, and operates on the audio signal. During the time that the retrieved signal contains the trigger phrase 190, the first biometric block performs a text-dependent (TD) speaker recognition process 192 on the received signal. During the following period when the retrieved signal contains the subsequent speech 194, the first biometric block performs a text-independent (TI) speaker recognition process 196 on the received signal.

The first biometric block performs a cumulative process, and so, as shown generally at 198, it generates a series of score values at successive times 200, 202 etc. At any desired time, these can be compared with a threshold value T. If the score exceeds the threshold value T, then this can be considered sufficient to determine that the speaker is a specific enrolled user.

The speaker change detection process uses a second biometric process Vbio2, and this similarly starts operating at time t2, and operates on the audio signal. In this case, both during the time that the retrieved signal contains the trigger phrase 204, and during the following period when the retrieved signal contains the subsequent speech 206, the second biometric block performs a text-independent (TI) speaker recognition process 208 on the received signal.

The second biometric block performs a process that is not cumulative, and so, as shown generally at 210, it generates a series of score values at successive times 212, 214, etc., that are somewhat independent of each other. However, when the same person is speaking, these scores are somewhat similar, reflecting the fact that the speech of that person is generally consistent. Thus, every score until the score at time 216 falls within the range from a to b.

However, the next score, at time 218, has a value of c, significantly outside the range from a to b. This sudden difference may be taken as an indication that a different person is speaking.

Line 220 shows the speaker change detection output and, in response to the score at time 218, this produces a speaker change detection signal 222.

This signal 222 can therefore be used to mark the end of the speech of the first speaker. This can therefore be used to ensure that only the speech of the first speaker is sent for speech recognition.

It will be noted that, although the change of speaker also causes a reduction in the cumulative score output by the first biometric process at time 224, this is not sufficient to take the score below the threshold value T, and it can be seen that the score may not fall below the threshold value T for some significant time. Thus, it can be seen that simply relying on the cumulative scoring biometric process would be inadequate to detect the speaker change.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker recognition, comprising:
receiving an audio signal comprising speech;
performing a biometric process on a first part of the audio signal, wherein the first part of the audio signal extends over a first time period;
obtaining a speaker recognition score from the biometric process for the first part of the audio signal;
performing a biometric process on a plurality of second parts of the audio signal, wherein the second parts of the audio signal are successive sections of the first part of the audio signal, and wherein each second part of the audio signal extends over a second time period and the second time period is shorter than the first time period;
obtaining a respective speaker recognition score from the biometric process for each second part of the audio signal; and
determining whether there has been a speaker change based on the respective speaker recognition scores for successive second parts of the audio signal.

2. A method as claimed in claim 1, wherein determining whether there has been a speaker change based on speaker recognition scores for successive second parts of the audio signal comprises determining that there has been a speaker change if speaker recognition scores for successive second parts of the audio signal show a variation that exceeds a threshold.

3. A method as claimed in claim 1, comprising:
storing the received audio signal;
performing a keyword detection process on the received audio signal; and
when a predetermined keyword is detected, identifying a start of the first time period at a start of the predetermined keyword.

4. A method as claimed in claim 3, comprising:
performing automatic speech recognition on the received audio signal from an end of the predetermined keyword.

5. A method as claimed in claim 4, comprising:
performing automatic speech recognition on the received audio signal from an end of the predetermined keyword only if the speaker recognition score obtained for the first part of the audio signal indicates that the speech is the speech of a predetermined speaker.

6. A method as claimed in claim 3, comprising:
performing a text-dependent biometric process on the received audio signal representing the predetermined keyword; and
performing a text-independent biometric process on the received audio signal following the predetermined keyword.

7. A method as claimed in claim 1, wherein the second time period is in the range 0.5s-1.5s.

8. A method as claimed in claim 1, comprising performing the biometric process on the first part of the audio signal at a plurality of times during the first time period, and obtaining a respective speaker recognition score at each of the plurality of times, wherein the speaker recognition score obtained at each of the plurality of times is a cumulative score relating to the first part of the audio signal up until that time.

9. A method as claimed in claim 1, comprising defining an end point of the first part of the audio signal in response to determining that there has been a speaker change, and then performing said biometric process on the first part of the audio signal.

10. A method as claimed in claim 1, comprising using said speaker recognition score obtained for the first part of the audio signal, only in response to determining that there has not been a speaker change during the first part of the audio signal.

11. A method as claimed in claim 1, wherein the step of obtaining the speaker recognition score from the biometric process for the first part of the audio signal comprises combining the respective speaker recognition scores obtained from the biometric process for each second part of the audio signal.

12. A method of speaker change detection, comprising:
receiving an audio signal representing speech;

performing at least one first speaker change detection process on the received audio signal to obtain information about times at which there may have been a speaker change;

performing a biometric process on a plurality of successive sections of the audio signal;

obtaining a speaker recognition score from the biometric process for each section of the audio signal;

obtaining information about times at which there may have been a speaker change, based on the speaker recognition scores obtained from the biometric process; and determining whether there has been a speaker change based on information obtained from the first speaker change detection process and based on information obtained from the speaker recognition scores.

13. A method as claimed in claim 12, wherein obtaining information about times at which there may have been a speaker change, based on the speaker recognition scores obtained from the biometric process, comprises examining successive speaker recognition scores for the sections of the audio signal in order to determine a series of difference values between pairs of consecutive speaker recognition scores for the successive sections of the audio signal; and determining that there may have been a speaker change when one of said difference values exceeds a threshold value.

14. A method as claimed in claim 12, wherein the first speaker change detection process comprises one or more of:
tracking a fundamental frequency of the speech;
tracking an angle of arrival of the speech at a device; and
comparing feature vectors extracted from the audio signal in successive time windows of the audio signal.

15. A method as claimed in claim 12, comprising obtaining a respective metric from the or each first speaker change detection process and from the speaker recognition scores obtained from the biometric process, wherein each respective metric indicates a likelihood that there has been a speaker change, and determining whether there has been a speaker change based on said metrics.

16. A method as claimed in claim 15, comprising:
combining the respective metrics to form a combined metric;
comparing the combined metric with a threshold value; and
determining whether there has been a speaker change based on a result of the comparison.

17. A method as claimed in claim 15, comprising:
comparing each metric with a respective threshold value; and
determining whether there has been a speaker change based on a result of the respective comparisons.

18. A method as claimed in claim 17, comprising:
determining that there has been a speaker change if any one of the metrics exceeds its respective threshold value.

19. A method as claimed in claim 17, comprising:
determining that there has been a speaker change if all of the metrics exceed their respective threshold values.

20. A system comprising:
an input for receiving an audio signal representing speech; and
a processor configured to perform a method in accordance with claim 1.

* * * * *